United States Patent
Fontaine

(10) Patent No.: US 6,439,284 B1
(45) Date of Patent: Aug. 27, 2002

(54) TREAD FOR A PNEUMATIC TIRE INCLUDING AQUACHANNEL

(75) Inventor: Jean Francoise Leon Fontaine, Buerden (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/463,841

(22) PCT Filed: Oct. 3, 1997

(86) PCT No.: PCT/US97/18031

§ 371 (c)(1),
(2), (4) Date: Jan. 24, 2002

(87) PCT Pub. No.: WO99/17944

PCT Pub. Date: Apr. 15, 1999

(51) Int. Cl.$^7$ .......................... B60C 11/03; B60C 11/13; B60C 11/12; B60C 101/00
(52) U.S. Cl. ............................ 152/209.15; 152/209.18; 152/209.21; 152/209.26; 152/209.28; 152/DIG. 3
(58) Field of Search ...................... 152/209.14, 209.15, 152/209.18, 209.21, 209.28, DIG. 3, 209.26

(56) References Cited

U.S. PATENT DOCUMENTS

| | | | |
|---|---|---|---|
| 1,413,190 A | * | 4/1922 | Rapson |
| 3,770,040 A | * | 11/1973 | De Cicco |
| 4,832,099 A | * | 5/1989 | Matsumoto |
| 5,343,918 A | * | 9/1994 | Fontaine |
| 6,065,518 A | * | 5/2000 | Miyawaki et al. |

FOREIGN PATENT DOCUMENTS

| | | | |
|---|---|---|---|
| DE | 37 12 155 | A | 10/1987 |
| EP | 0 305 617 | A | 3/1989 |
| EP | 508090 | * | 10/1992 |
| EP | 588781 | * | 3/1994 |
| EP | 0 600 177 | A | 6/1994 |
| FR | 782 332 | A | 6/1935 |
| FR | 1214717 | * | 4/1960 |
| JP | 62-268708 | * | 11/1987 |
| JP | 5-338412 | * | 12/1993 |
| JP | 6-199109 | * | 7/1994 |
| JP | 9-142106 | * | 6/1997 |

OTHER PUBLICATIONS

Patent Abstracts of Japan, vol. 015, No. 475 (M–1186), Dec. 3, 1991.
Patent Abstracts of Japan, vol. 018, No. 177 (M–1582), Mar. 25, 1994.

* cited by examiner

*Primary Examiner*—Steven D. Maki
(74) *Attorney, Agent, or Firm*—David L. King

(57) ABSTRACT

A tread 2 for a pneumatic tire 1 has a central portion defining two circumferentially extending center ribs 22, 23 having an axial width RW, and $RN_2$ ranging from 5% to 25% of the tread width TW. The centermost circumferentially extending groove 8 has on both sides a tapered groove wall edges which form with a plane parallel to the equational plane acute angles $\alpha_1$ and $\alpha_2$ ranging between 1 and 10°. The tread height near both edges of the centermost groove extend radially above the average tread height a maximum extra tread height of between 0.3 mm and 1.7 mm. The extra tread height diminishes progressively from the groove edges $P_0$ $P_1$ toward the respective shoulder 3,4 a distance not exceeding 10% of the treadwidth.

13 Claims, 3 Drawing Sheets

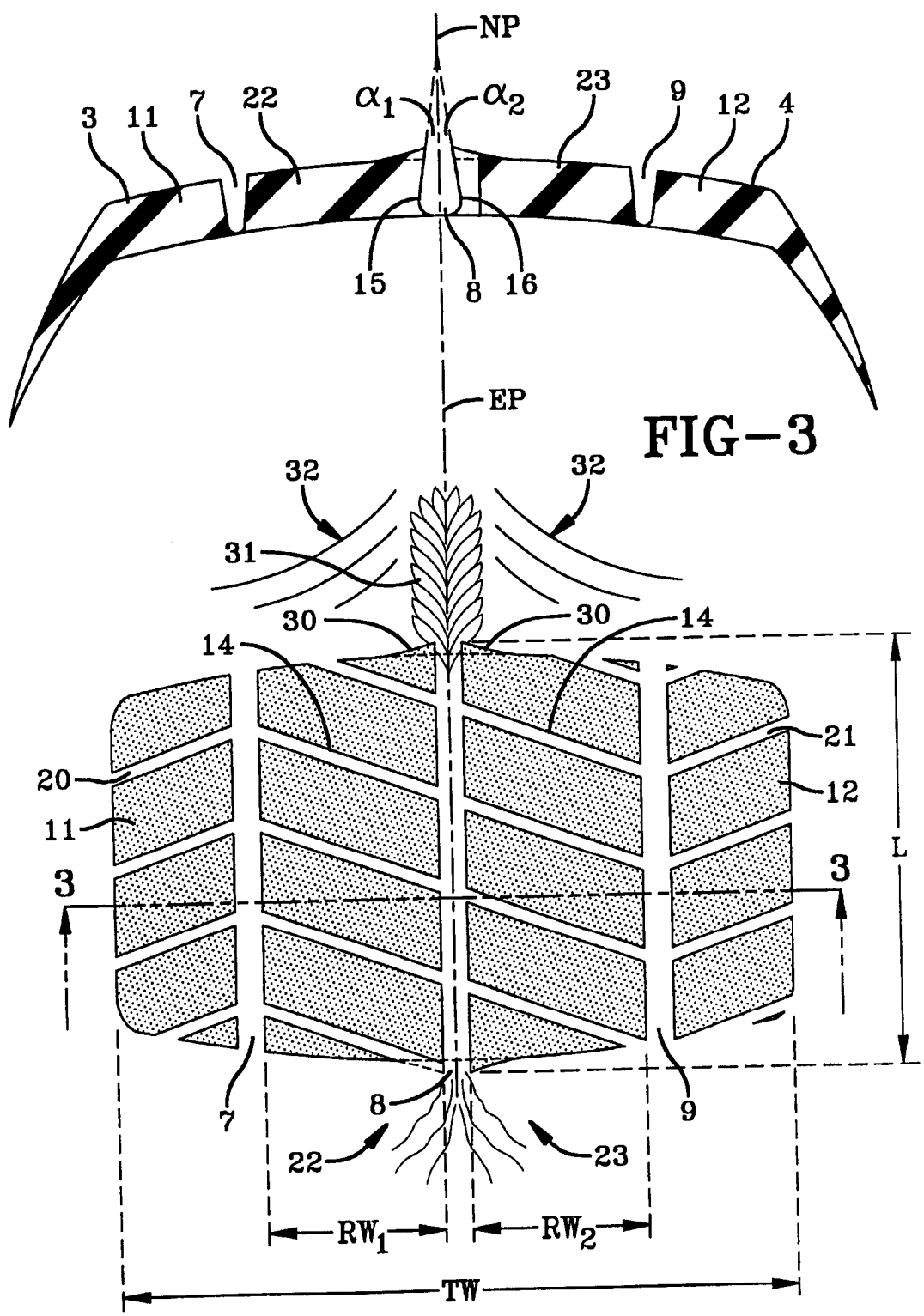

TREAD FOR A PNEUMATIC TIRE INCLUDING AQUACHANNEL

TECHNICAL FIELD

The present invention relates to a tread for a pneumatic radial tire.

BACKGROUND ART

The tread portion of a pneumatic tire generally comprises an elastomeric material having a plurality of grooves therein defining ground engaging rubber elements. The particular size and shape of these elements contributes significantly to the overall performance of the tire. Tire treads are generally designed to provide a particular performance, such as for instance winter, high traction or high speed performance. Thus obtaining of one particular performance characteristic is often at odds with obtaining another one.

Hydroplaning of tires on wet pavement has long been a problem in the prior art.

Various tire designs, adapted to channel water away from the tire, and thereby maintain rubber contact with the road have been created. Although prior art rain tire designs, such as described e.g. in EP-A-508 090, have improved wet traction, it is a continuing goal in the art to further improve such.

French patent 1 214 717 teaches a way to improve road adherence by providing the tread pattern with raised block elements. The raised elements are described as acting as elastic, heavily compressed projections entering the small holes in the road surface and improving thereby the grip of the tire. U.S. Pat. No. 5,343,918 discloses a tire tread with at least one circumferentially extending row of high stiffness blocks and one of low stiffness blocks.

The low stiffness blocks have a radial height between 4% and 10% superior to the radial height of the high stiffness blocks. The object is to obtain uniform handling response and to improve grip.

In French Patent FR782332A teaches that the tread height near one edge of a centermost groove extends above the average tread height to improve traction.

In the Japanese Patent Abstract JP05338412A to Sumitomo Rubber Ind LTD, it teaches the groove wall edges can be acute angles to improve the useful life of the tire.

In the most relevant document EP-A-0-508 090 the features recited in the preamble of the claim are disclosed. Those features after the preamble being the novel features not found in the art in the combination claimed. The dependent claims representing features of the various preferred embodiments of the invention.

It is an object of the present invention to provide a pneumatic tire having improved wet traction while maintaining good handling, noise and irregular wear characteristics.

Other objects of the invention will be apparent from the following description and claims.

Disclosure of Invention

A tread 2 for a pneumatic tire 1 has elastomeric material. The tread 2 has a central portion and two shoulders 3, 4. The tread defines ribs or rows of lugs.

The central portion includes three laterally spaced circumferentially extending grooves 7, 8, 9, defining two circumferentially extending center ribs 22, 23 having an axial width RW ranging from 5% to 25% of the tread width TW of the ground engaging tread portion.

The centermost circumferentially extending groove 8 has on both sides tapered groove sidewalls which form with a radial plane NP acute angles $\alpha_1$ and $\alpha_2$ ranging between 1 and 10 degrees, preferably between 2 and 7 degrees, more preferably between 3 and 5 degrees. The tread height near both edges $P_0, P_2$ of the centermost groove extending radially above the average tread height a maximum extra tread height comprised of 0.3 mm and 1.7 mm most preferably between 0.8 and 1.2 mm. This extra tread height diminishes progressively from the groove edges towards the respective nearest shoulder of the tire over a distance not exceeding 10% of the tread width.

Preferably the circumferentially extending center ribs 22, 23 are cut by snipes 14 and may include blind grooves 52, 53.

The width of the circumferentially extending centermost groove at 8, 53, 68, 77 the tread surface is between 5 and 20 mm and the groove is spaced from the equatorial plane a distance equaling at most 25% of the treadwidth TW.

The tread 2 is delimited by a first and a second shoulder 3, 4. The central portion includes three laterally spaced circumferentially extending grooves defining two circumferentially extending center ribs having an axial width RW ranging from about 5% to 25% of the treadwidth TW of the ground engaging tread portion.

The centermost circumferentially extending groove has on both sides tapered groove sidewalls, which form with a plane parallel to the equatorial plane acute angles $\alpha_1$ and $\alpha_2$ ranging between 1 and 10 degrees.

In an axial cross section of the tread 2, the radially outer tread surface, on a first side and second side of the centermost groove, has at least a first and at least a second radius of curvature $R_1$ and $R_2$ respectively. The first radius of curvature $R_1$ has its center $C_1$ radially outwardly of the tread surface, in a plane parallel to the equatorial plane and located between the first side of the center groove and the fist shoulder of the tire. $R_1$ extends from a point $P_0$ on the edge the groove wall forms with the tread surface to a point $P_1$ located a distance between 5% and 15% of the treadwidth, defining thereby a first radially outer concave tread surface.

The second radius of curvature $R_2$, has its center $C_2$ radially outwardly of the tread surface, in a plane parallel to the equatorial plane and located between the second side of the center groove and the second shoulder of the tire. $R_2$ extends from a point $P_2$ on the edge the groove wall forms with the tread surface to a point $P_3$ located a distance between 5% and 15% of the treadwidth, defining thereby a second radially outer concave tread surface.

The centers of curvature $C_1$ and $C_2$ lie preferably in a plane located from the respective edges of the centermost groove they define, a distance ranging between 5% and 10% of the treadwidth. The point $P_1$ is spaced from $P_0$ a distance of about 7% of the tread width and the point $P_3$ is spaced from $P_2$ a distance of about 7% of the treadwidth.

Definitions

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chaffers, to fit the design rim.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Design rim" means a rim having a specified Configuration and width.

"Directional tread" refers to a tread design which has a preferred direction of rotation in the forward direction of travel.

"Equatorial plane (EP)" means the plane Perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be sub-classified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Sipes" refers to small slots molded into ribs or lugs of a tire that subdivides the tread surface and improves traction characteristics. Sipes tend to close completely in a tire footprint.

"Lugs" refer to discontinuous radial rows of tread rubber in direct contact with the. road surface.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves. "Sidewall" means that portion of a tire between the tread and the bead.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

BRIEF DESCRIPTION OF DRAWINGS

FIG. 2 shows a footprint of the tread of the tire of FIG. 1.

FIG. 3 is a cross-section of the footprint shown in FIG. 2, along the line III—III.

DETAILED DESCRIPTION OF THE INVENTION

Figure 1:
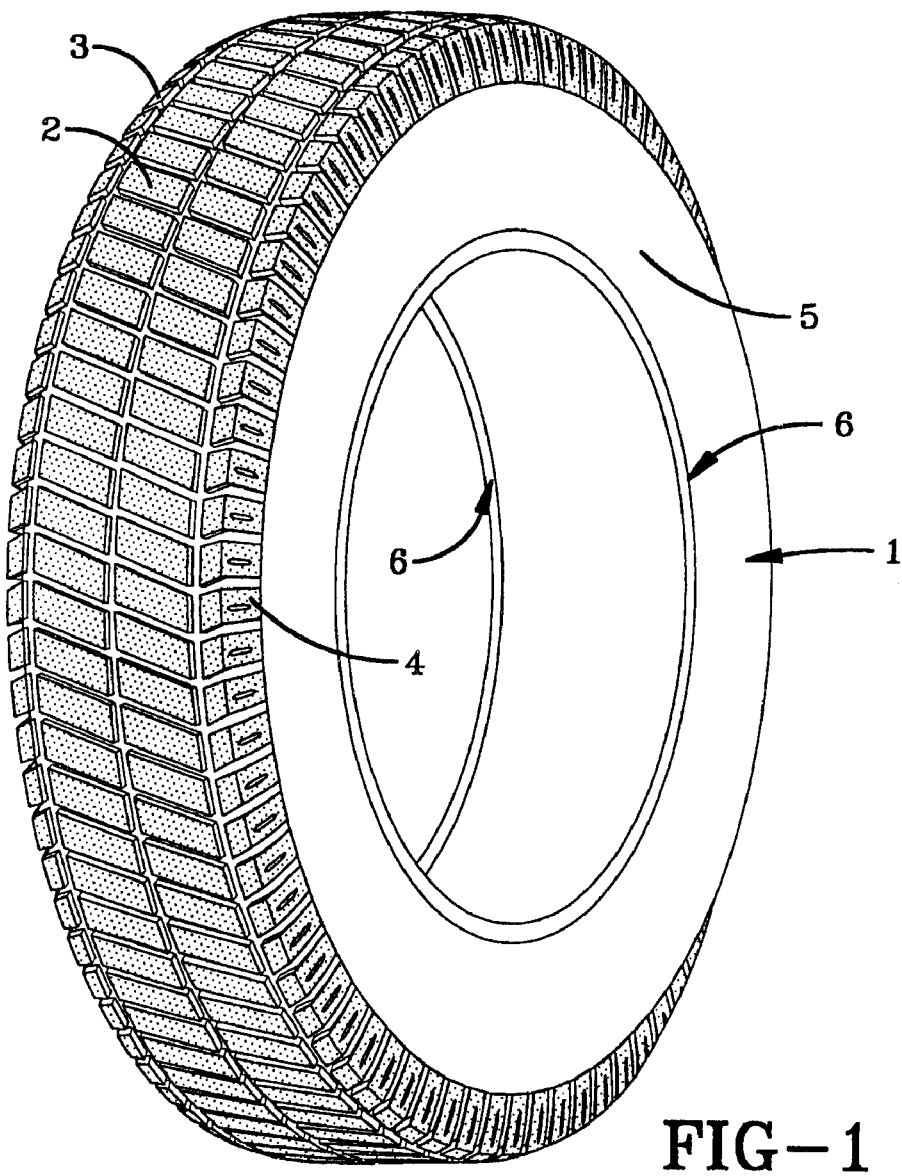
FIG. 1 is a perspective view of a tire embodying a tread made in accordance with the present invention.

Referring to FIGS. 1 and 2, there is represented a pneumatic tire 1 including in its crown region a tread 2 made in accordance with the present invention. The tire 1 is of the radial type construction and designed for use on passenger vehicles. The tread 2 is delimited by a first shoulder 3 and a second shoulder 4. Sidewalls 5 connect the shoulders 3, 4 to the beads 6. The tread 2 includes three circumferentially extending straight grooves 7, 8, 9 and two sets of laterally extending grooves 20 and 21. The various grooves are respectively laterally and circumferentially spaced apart across the surface of the tread and divide the tread into circumferentially extending ribs 22 and 23 near the equatorial plane EP and rows of blocks 11, 12 near the shoulders 3, 4 of the tire.

The two ribs 22, 23 have respectively an axial width $RW_1$ and $RW_2$ and extend substantially an equal distance on either side of the equatorial plane EP. The widths RW, range each from 5% to 25% and preferably from 10% to 15% of the tread width TW of the ground engaging tread portion. The width of the circumferentially extending centermost groove 8 at the tread surface is between 5 and 20 mm.

The laterally extending grooves 20 and 21 near the shoulders 3, 4 are disposed circumferentially about the tire in a repetitive manner, their widths and inclinations depending on the pitch variation, as is practiced in the industry for noise reduction. The grooves 20 and 21 may form opposed angles with the equatorial plane so as to give a directional tire, as e.g. represented in FIG. 5. or—as represented—the grooves 20 and 21 may make complementary angles with the equatorial plane so as to provide a non directional tire.

In a preferred embodiment, the ribs 22, 23 are cut by narrow grooves, i.e. grooves having a width ranging between 0.5% to 2% of the treadwidth, or by sipes 14. The narrow grooves or sipes 14 have preferably an inclination with respect to the equatorial plane ranging between 30 and 60 degrees.

Though the invention may be implemented in any passenger and light truck tire, low aspect ratio tires where the length of the contact patch in the footprint is smaller than the treadwidth TW are of special interest. In tires having aspect ratios below 60 the invention provides a most desirable increase of the hydroplaning speed.

In order to facilitate the flow of water out of the middle portion of the contact patch of the tire footprint, the centermost circumferentially extending groove 8, which is either cut by, or is spaced from the equatorial plane E;P a distance equaling at most 25% of the width, preferably at most 10%, has on both sides tapered groove sidewalls. Such can be distinguished in FIG. 3. In an axial section of the tire, the angles $\alpha_1$, $\alpha_2$ formed respectively by the uppermost portion of a first and second lateral side 15, 16 of the groove 8 with a plane NP parallel to the equatorial plane are acute, so that the distance between the opposing sidewalls of the groove diminishes radially outwardly. The angles $\alpha_1$ range between 1 and 10 degrees, and are preferably between 2 and 7 degrees and more preferably between 3 and 5 degrees. The groove walls form with a plane NP parallel to the equatorial plane, such negative taper angle from the tread surface of a new tire down to 1–3 mm above the groove bottom. In a preferred embodiment of the invention the angles formed by groove portions on the same sidewall at different radial heights are substantially similar. In case the center groove 5 is not located in the middle of the tread, choosing different taper angles for the opposing sidewalls might be of advantage.

Figure 4:
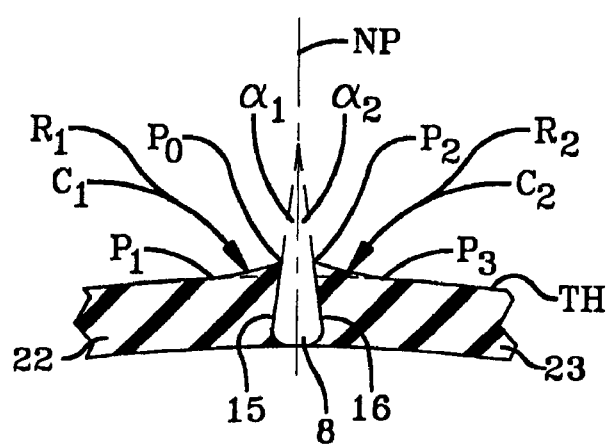
FIG. 4 is a detailed cross-section of the center part of the tread of FIG. 1.

Reference is now more specifically made to FIG. 4. Jointly with the negatively by tapered groove wall angles $\alpha_1$, the tread height near both edges $P_0, P_2$ of the centermost grove 8 extends above the average tread height TH and this extra tread height diminishes progressively from the grove edges $P_0, P_2$ towards the respective shoulders 3,4 of the tire on a distance not exceedingly 15%, preferably not exceeding 5% of the treadwidth. At both centermost groove sidewalls, the tread extends radially between 0.3 mm and 1.7 mm, preferably between 0.6 and 1.4 mm and most preferably between 0.8 and 1.2 mm above the average trade height TH. Put in other words, in an axial cross section of the tread, the radially outer tread surface, on a first side 15 and a second side 16 of the centermost groove 8, has respectively a first and second radius of curvature $R_1$, $R_2$ wherein the first radius of curvature $R_1$, having its center $C_1$ radially outwardly of the tread surface, in a plane located between the first side 15 of the center groove and the first shoulder 3 of the tire, extends from a point $P_0$ on the edge, the groove wall 15 forms with the tread surface, to a point $P_1$ located a distance between 5% and 15% of the treadwidth, defining thereby a first radially outer concave tread surface; the second radius of curvature $R_1$ having its center $C_2$ radially outwardly of the tread surface, in a plane located between the second side 16 of the centermost groove and the second shoulder 4 of the tire, extends from a point $P_2$ on the edge, the groove wall 16 forms with the tread surface to a point $P_3$ located a distance between 5% and 15% of the treadwidth defining thereby a second radially outer concave tread surface.

The centers of curvature $C_1$ and $C_2$ lie preferably in a plane parallel to the equatorial plane located from the respective edges $P_0$ and $P_1$ a distance ranging between 5% and 10% of the treadwidth.

The radii of curvature, $R_1$ and $R_2$, are substantially similar and range between 5 mm and 30 mm. More preferably, the radii of curvature range between 10 mm and 20 mm.

In a further embodiment of the invention, the rally outer tread surface of the tread near the centermost groove is defined by two or three different radii on one or both sides of the groove. The farther the centers of curvature lie away from the grove wall, the longer the radii are.

It is understood that the remaining portions of the tread surface are defined by the usual two or three radii of curvature, having values comprised between 150 mm and infinity, whereby the centers of curvature lie radially inwardly of the tread surface they define.

The effect of the design according to the invention is explained in FIG. 2 where the flow of water in a tire has been represented. The raised groove edges 30 contact the ground or the water on the ground a few millimeters before the other portions of the tread. Similarly these same groove edges are the last portions of the tread to leave the footprint and define thereby the maximum length L of the footprint.

If the road is covered by water, the groove edges 30 impart a flowing movemento the water which flowing movement is normal to the leading footprint edge. As in the present case the leading footprint edge presents a convex curvature to the water, the latter is pushed sideward out of the middle of the footprint. This beneficial effect of the invention based on the shape of the leading edge of the footprint is boosted by the jet of water 31, squeezed out of the centermost groove 8 as the tread enters the footprint. The water jet enhances the effect of the convex curvature of the center portion of the leading footprint edge and initiates lateral water flow 32 in front—and out of—the footprint The shape or length of this water jet depends on the car speed, the water depth and resulting water pressure buildup, the exact design and tread depth of the tire, the pavement below the water etc. Though the length of the water jet diminishes continuously as the car speed increases and disappears at speeds above 90 km/h, the combined effect of the convex leading edge of the footprint together with the water jet will be a significant increase of the aquaplaning resistance of a tire in deep water.

Figure 5:
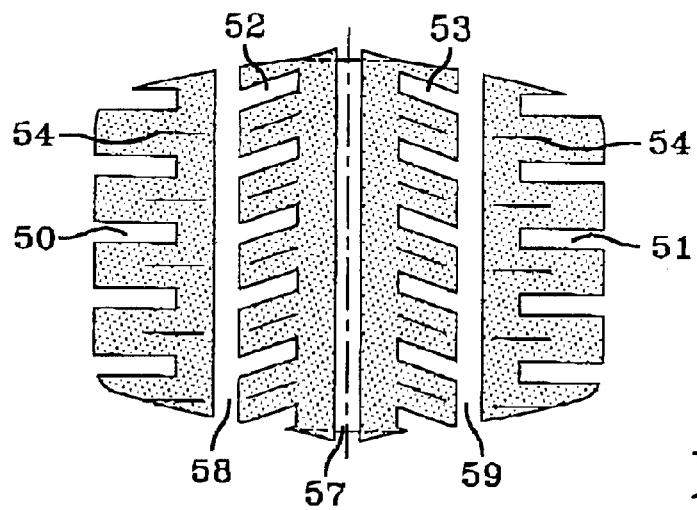
FIG. 5 is a footprint of a directional tread according to the invention.

FIG. 5 represents a footprint of a directional tread according to the invention which tread is symmetrical with respect to the equatorial plane of the ire. In this embodiment of the invention, the tread includes three circumferentially extending straight grooves, and four sets of laterally extending grooves 50, 51, 52, 53. The various grooves are respectively laterally and circumferentially spaced apart across the surface of the tread and divide the tread into circumferentially extending ribs The two ribs, which are defined by the two circumferentially extending shoulder grooves 58, 59 and the center groove 57, are adjacent to the equatorial plane EP. The ribs include circumferentially spaced blind grooves 52 and 53, originating in the shoulder grooves 58, 59. The blind laterally extending grooves 50, 51 near the shoulders of the tire are disposed circumferentially about the tire in a repetitive manner, in ribs. The ribs may include sipes 54 so as to optimize noise and wear properties of the tire; the sipes may be straight, curved or zigzag like and they may have the same depth as the neighboring grooves or varying depths. In order to improve the aquaplaning resistance of this directional design, the center groove 57 has a section as represented in FIG. 4.

Figure 6:
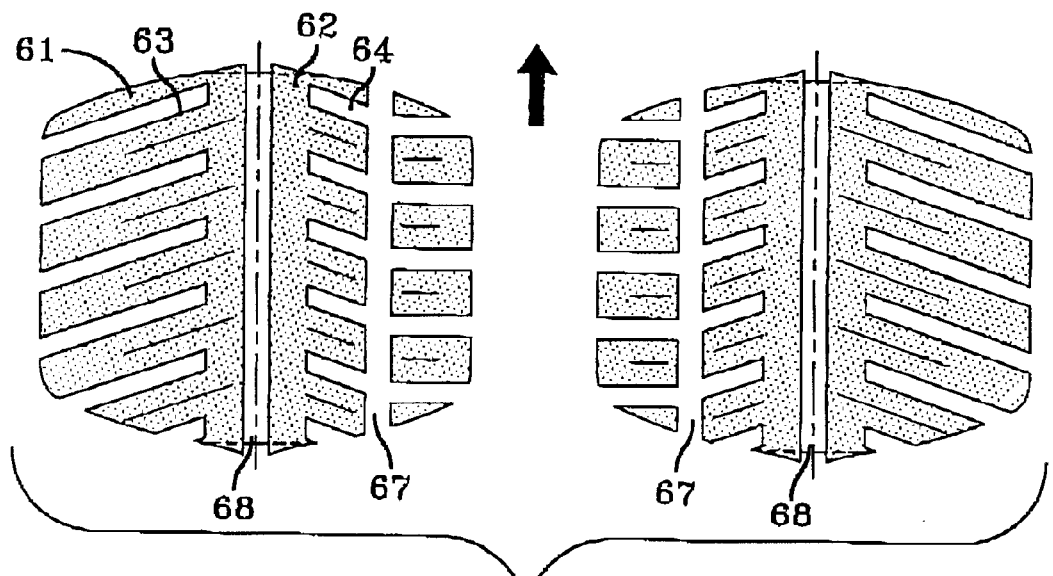
FIG. 6 shows the footprints of two asymmetrical directional tire treads according to the invention.

FIG. 6 shows on its left side a footprint of an asymmetrical directional tire tread to be mounted on the left side of a car and on its right side a footprint of an asymmetrical directional tire tread to be mounted on the right side of a car. The forward travel direction of the car is represented by an arrow. Though only two circumferentially extending grooves 67, 68 have been represented, three or more may be foreseen. Groove 68, having a section as represented in FIG. 4, is delimited by two ribs 61, 62 which, as explained above with respect to FIG. 5, include blind grooves 63, 64 and sipes. The remaining circumferentially extending groove or grooves cooperate with laterally extending groove so as to define rows of blocks. Groove 68, is positioned towards the outer side of the car at a distance from the equatorial plane EP comprised between 10% and 30% of the treadwidth.

Figure 7:
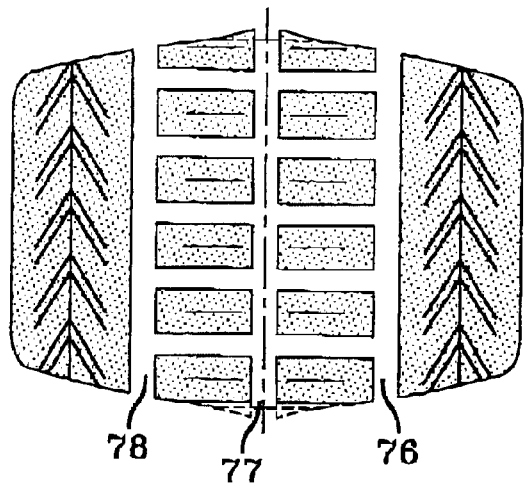
FIG. 7 is a footprint of a high performance low aspect ratio tire according to the invention.

FIG. 7 shows a footprint of a high performance low aspect ratio tire according to the invention. By low aspect ratio tire is meant here a tire having an aspect ratio below 55. The tread includes three circumferentially extending grooves 76, 77, 78 wherefrom the middle groove 77 is preferably a so-called aqua channel as e.g. described in EP-A-508 090. The rubbery material—lugs or ribs—adjacent to aqua channel 77 is contoured into the aqua channel, such that in a transverse section, the aqua channel has a curved U shape (having a rounded bottom and curved sides) favoring evacuation of large amounts of water. In each of the shoulders of the tire is located a groove, 76 respectively 78, having a cross section as shown in FIG. 4. If the road is covered by water, the edges of the grooves 76 and 78 impart a flow to the water, which is normal to each of the leading footprint edges. The water is pushed sideward to the shoulders, out of the footprint and towards the middle of the tire in front of the aqua channel 77.

The invention is further illustrated by the following example: A steel belted radial carcass tire of size 225/70 R 16 has a tread width of about 160 mm, two center ribs and 2 rows of blocks. The rows of blocks are molded to have axial widths $RW_1$ and $RW_3$ of about 30 mm and 35 mm respectively.

The nominal tread depth is about 9 mm, and the widths of the grooves depend on their axial position in the tread and the pitch variation. The circumferentially extending grooves have a width of about 30 mm.

Two carcass plies comprise 1100/2 dtex polyester reinforcement cords and an uncured cord density of 30 ends per inch (EPI) was used in the construction. The belt structure of an uncured tire comprises two single cut plies reinforced by 2+2×0.25 mm steel cords, having a cord density of about 22 EPI, forming uncured angles of about 23° with the equatorial plane, the angles of the cables in different plies extending in opposite directions.

The tread has a net to gross of 58% to 73% and comprises an elastomeric compound having a modulus of 4 to 16 MPa, a Shore A hardness of 60 to 75, an elongation greater than 300% and a tensile strength at break greater than 15 MPa.

While certain representative embodiments have been described for the purpose of illustrating the invention, it will be apparent to those skilled in the art that various changes and modifications may be made therein without departing from the scope of the claims.

What is claimed is:

1. A tread for a pneumatic tire comprising elastomeric material, said tread having a central portion and two shoulders, said tread having a ground contacting width defining a treadwidth TW, said tread including three circumferentially extending grooves, wherein two of the circumferentially extending grooves, and a centermost circumferentially extending groove of the circumferentially extending grooves, define two circumferentially extending center ribs, each center rib having an axial width RW from 5% to 25% of the treadwidth TW of the ground contacting portion; at least one of the three circumferentially extending grooves having on both sides tapered groove sidewalls, which form with a radial plane (NP) angles $\alpha_1$ and $\alpha_2$ characterized in that $\alpha_1$, and $\alpha_2$ are acute angles ranging between 1 and 10 degrees, such that the distance between the opposing sidewalls of the groove diminishes radially outwardly, and the tread height near both groove edges of the groove having the tapered sidewalls extending radially above the average tread height of the tread a maximum extra tread height comprised between 0.3 mm and 1.7 mm, this extra tread height diminishing progressively from the groove edges towards the respective nearest shoulder of the tire on a distance not exceeding 15% of the treadwidth (TW) and wherein the centermost groove is a circumferentially extending aqua channel cut into two equal halves by the equatorial plane (EP).

2. A tread for a pneumatic tire according to claim 1, wherein the circumferentially extending center ribs are cut by sipes.

3. A tread for a pneumatic tire according to claim 1, wherein the circumferentially extending center ribs includes blind grooves.

4. A tread for a pneumatic tire according to claim 1, wherein the width of the at least one of the two circumferentially extending grooves at the tread surface is comprised between 5 and 20 mm.

5. A tread for a pneumatic tire according to claim 1, wherein the angles $\alpha_1$ range between 2 and 7 degrees.

6. A tread for a pneumatic tire according to claim 1, wherein the extra tread height at the edges of the at least one of the two circumferentially extending grooves, is comprised between 0.8 and 1.2 mm.

7. A tread for a pneumatic tire according to claim 1, wherein in an axial cross section of the tread, the radially outer tread surface, on a first side and second side of the at least one of the two circumferentially extending grooves, has at least a first and at least a second radius of curvature $R_1$ and $R_2$ respectively;

wherein the first radius of curvature $R_1$, having its center $C_1$ radially outwardly of the tread surface, in a plane parallel to the equatorial plane (EP) and located between the first side of the center groove and the first shoulder of the tire extends from a point $P_0$ on the edge the groove wall to a point $P_1$ located a distance between 5% and 15% of the tread width, defining thereby a first radially outer concave tread surface; and wherein the second radius of curvature $R_2$, having its center $C_2$ radially outwardly of the tread surface, in a plane parallel to the equatorial plane and located between the second side of the center groove and the second shoulder of the tire, extends from a point $P_2$ on the edge the groove wall to a point $P_3$ located a distance between 5% and 15% of the tread width, defining thereby a second radially outer concave tread surface.

8. A tread for a pneumatic tire according to claim 7, wherein the centers of the curvature $C_1$ and $C_2$ are located from the respective edges of the centermost groove they define, a distance ranging between 5% and 10% of the treadwidth.

9. A tread for a pneumatic tire according to claim 7, wherein the point $P_1$ is spaced from $P_0$ a distance of about 7% of the tread width and the point $P_3$ is spaced from $P_2$ a distance of about 7% of the tread width.

10. A tread for a pneumatic tire according to claim 9, wherein there are two different radii $R_1$ of curvature on at least one side of the at least one of the two circumferentially extending grooves, the centers of curvature of said radii lying farther away from the respective groove wall, the longer the radii are.

11. A tread for a pneumatic tire according to claim 1 wherein the tire has an aspect ratio below 55%.

12. The read for the pneumatic tire according to claim 11 wherein each shoulder defines a circumferentially extending rib which is cut by blind grooves which do not extend into one of the circumferentially extending grooves.

13. The tread for a pneumatic tire according to claim 1 wherein each shoulder defines a row of lugs.

* * * * *